United States Patent
Sharif Sheikhaleslami et al.

(10) Patent No.: US 10,081,548 B2
(45) Date of Patent: Sep. 25, 2018

(54) PRODUCTION OF ORDERED MESOPOROUS CARBON MATERIALS

(71) Applicants: Seyyed Mohammad Ali Sharif Sheikhaleslami, Tehran (IR); Ali Beitollahi, Tehran (IR)

(72) Inventors: Seyyed Mohammad Ali Sharif Sheikhaleslami, Tehran (IR); Ali Beitollahi, Tehran (IR)

(*) Notice: Subject to any disclaimer, the term of this patent is extended or adjusted under 35 U.S.C. 154(b) by 44 days.

(21) Appl. No.: 15/177,016

(22) Filed: Jun. 8, 2016

(65) Prior Publication Data
US 2016/0280553 A1 Sep. 29, 2016

Related U.S. Application Data

(60) Provisional application No. 62/208,918, filed on Aug. 24, 2015.

(51) Int. Cl.
| | | |
|---|---|---|
| *C01B 31/02* | (2006.01) | |
| *C01B 31/08* | (2006.01) | |
| *C08G 81/02* | (2006.01) | |
| *C01B 32/05* | (2017.01) | |
| *C01B 32/00* | (2017.01) | |

(52) U.S. Cl.
CPC ............ *C01B 31/085* (2013.01); *C01B 32/00* (2017.08); *C01B 32/05* (2017.08); *C08G 81/025* (2013.01); *C01P 2006/17* (2013.01); *C01P 2006/40* (2013.01)

(58) Field of Classification Search
CPC .................................................... C01B 32/05
See application file for complete search history.

(56) References Cited

U.S. PATENT DOCUMENTS

| | | | | |
|---|---|---|---|---|
| 6,547,990 | B2* | 4/2003 | Shinozaki | H01G 9/155 252/502 |
| 8,513,319 | B2 | 8/2013 | Dai et al. | |
| 9,828,259 | B2* | 11/2017 | Stoddart | C02F 1/285 |

OTHER PUBLICATIONS

Nabanita Pal, Soft templating strategies for the synthesis of mesoporous materials: Inorganic, organic-inorganic hybrid and purely organic solids, Advances in Colloid and Interface Science, Mar. 2013, vols. 189-190, pp. 21-41.

Yan Meng, Ordered Mesoporous Polymers and Homologous Carbon Frameworks: Amphiphilic Surfactant Templating and Direct Transformation, Angewandte Chemie, Oct. 12, 2005, vol. 117, Issue 43, pp. 7215-7221.

Xiqing Wang, Facile Synthesis of Ordered Mesoporous Carbons with High Thermal Stability by Self-Assembly of Resorcinol-Formaldehyde and Block Copolymers under Highly Acidic Conditions, Langmuir, Jun. 12, 2008, vol. 24, Issue 14, pp. 7500-7505.

Mingzhi Dai, Ordered Mesoporous Carbon Composite Films Containing Cobalt Oxide and Vanadia for Electrochemical Applications, Chemistry of Materials, May 10, 2011, vol. 23, Issue 11, pp. 2869-2878.

* cited by examiner

*Primary Examiner* — Stuart Hendrickson
(74) *Attorney, Agent, or Firm* — NovoTechIP International PLLC

(57) ABSTRACT

A precursor composition is provided, including a templating component having a block copolymer, a phenolic compound, a cross-linkable aldehyde component, and a graphitizing agent including a polyaromatic hydrocarbon (PAH). The precursor composition is polymerized to form a polymerized carbonization precursor. The polymerized carbonization precursor is carbonized to form a mesoporous carbon material.

20 Claims, 15 Drawing Sheets

PRODUCTION OF ORDERED MESOPOROUS CARBON MATERIALS

CROSS REFERENCE TO RELATED APPLICATION

This application claims the benefit of priority from pending U.S. Provisional Patent Application Ser. No. 62/208,918, filed on Aug. 24, 2015, and entitled "Method for production of ordered mesoporous carbon with high electrical conductivity," which is incorporated by reference herein in its entirety.

TECHNICAL FIELD

The present application generally relates to the field of porous carbon materials, and more particularly, to mesoporous carbon materials.

BACKGROUND

Mesoporous carbon materials have received wide attention owing to their increasing number of utilities, e.g., as gas separation, water purification (i.e., nano-filtration), catalyst support, electrode materials, and electrochemical energy applications. The diversity of these applications can be related to different characteristics of mesoporous carbon materials, such as electrical/thermal conductivity, chemical stability along with high surface area and accessible pore channels of high volume. These characteristics can be obtained using appropriate synthesis methods.

In case of electrochemical energy applications, mesoporous carbon materials should meet two major criteria: first, an outstanding electrical conductivity for establishing efficient conductive networks, and second, setup of hierarchical interconnected micro/mesopores of high surface areas to act as ion channel routes and ion storage means.

Different methods have been used in order to synthesize highly crystalline ordered mesoporous carbon materials of high specific surface areas/pore volumes and controlled pore size, using different processing conditions and precursors by hard and soft templates.

However, despite all of such efforts, the development of highly crystalline powders composed of graphitized regions along with high specific surface areas is still a great challenge. There is, therefore, a need in the art for a fabrication method for producing ordered mesoporous carbon materials with high electrical conductivity and specific surface area. Moreover, there is a need in the art for a method for developing graphene structure within amorphous carbon matrix of mesoporous carbon materials.

SUMMARY

In one general aspect, the present disclosure describes a method for fabricating a mesoporous carbon material. The method can include steps of: first, providing a precursor composition, which can include: (i) a templating component including a block copolymer, (ii) a phenolic compound, (iii) a cross-linkable aldehyde component, and (iv) a graphitizing agent including a polyaromatic hydrocarbon (PAH); then, subjecting the precursor composition to a polymerization step to form a polymerized carbonization precursor; and finally subjecting the polymerized carbonization precursor to a carbonization step to convert the polymerized carbonization precursor to a mesoporous carbon material.

The above general aspect may include one of the following features. The block copolymer can include a poloxamer tri-block copolymer and the phenolic compound can be selected from a group consisting of phenolic compounds having one phenolic group, phenolic compounds having two phenolic groups, phenolic compounds having three phenolic groups, and combinations thereof.

In some implementations, the cross-linkable aldehyde component can include an organic compound or material containing an aldehyde group, for example, formaldehyde, or it can be selected from a group consisting of organoaldehydes, organodialdehydes, polyaldehydes, and combinations thereof.

According to an implementation, the PAH can be selected from a group consisting of Emodin, Tetracycline, 2-Aminoantheracene, and a combination thereof.

According to some implementations, the step of providing a precursor composition can include steps of: synthesizing phenolic resin oligomers using the phenolic compound and the cross-linkable aldehyde; and mixing the phenolic resin oligomers with the templating component and the graphitizing agent to obtain a mixture. The mixture can then be cast and dried to obtain the precursor composition.

According to other implementations, the polymerization step can include thermopolymerizing at a temperature of at least 100° C.

According to one implementation, the carbonization step can include heating at a temperature of at least 300° C. for at least 1 hour. According to another implementation, the carbonization step comprises heating at a temperature of about 900° C. for at least 2 hours. According to yet another implementation, the carbonization step can include: first, heating at a temperature of about 350° C. for at least 1 hour; and then heating at a temperature of about 900° C. for at least 1 hour.

DETAILED DESCRIPTION

The present disclosure describes a method for fabricating an ordered mesoporous carbon material. As used in this disclosure, the term "mesoporous" indicates a material containing "mesopores," which are pores having a diameter of between about 2 nm and about 50 nm. The method involves providing (i.e., preparing) a precursor composition, which will be subjected to a polymerization step followed by a carbonization step in order to produce an ordered mesoporous carbon material.

Figure 1:
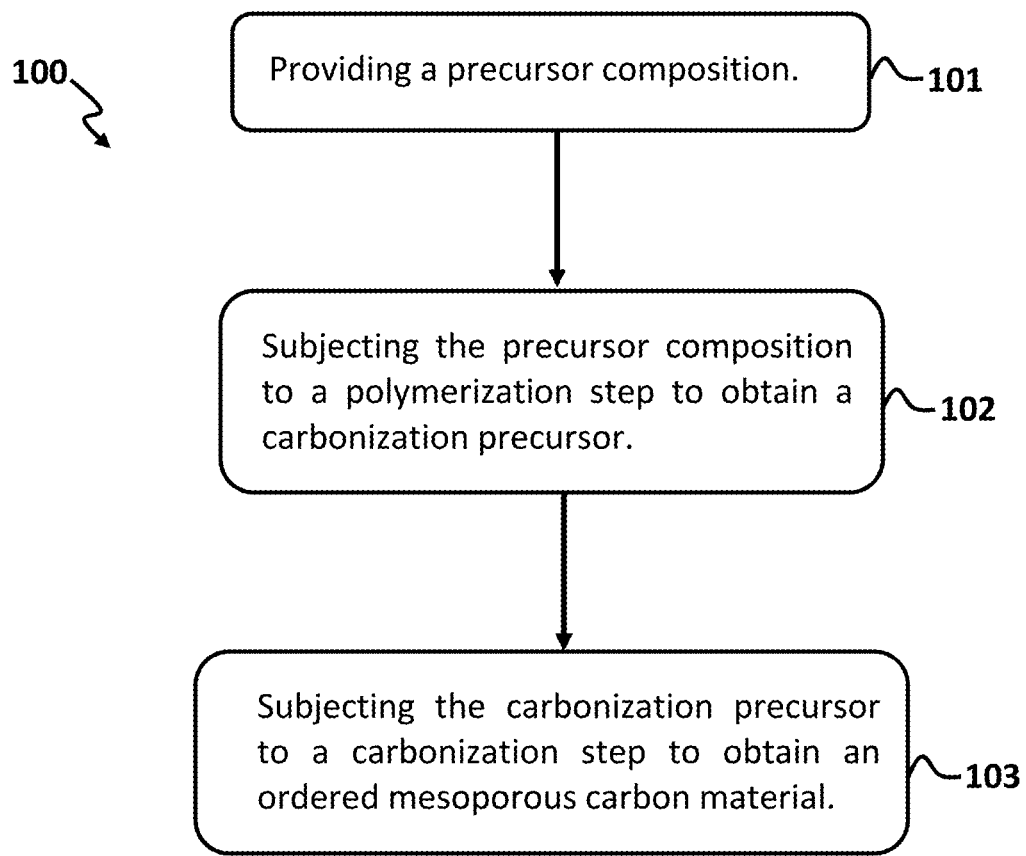
FIG. 1 illustrates an example fabrication method for an ordered mesoporous carbon material pursuant to the teachings of the present disclosure.

FIG. 1 illustrates an example fabrication method 100 for an ordered mesoporous carbon material pursuant to the teachings of the present disclosure. The method 100 can include steps of: providing a precursor composition (step 101); subjecting the precursor composition to a polymerization step to obtain a polymerized (and optionally, cross-linked) carbonization precursor (step 102); and subjecting the polymerized carbonization precursor to a carbonization step to obtain an ordered mesoporous carbon material (step 103).

The precursor composition can include: polymer precursor components (i.e., a phenolic compound and a cross-linkable aldehyde component), a templating component containing a block copolymer, and an organic graphitizing agent containing a poly aromatic hydrocarbon (hereinafter "PAH").

The step of providing the precursor composition 101 can include: first, synthesizing phenolic resin oligomers using the polymer precursor components; then, mixing the phenolic resin oligomers with the templating component and the organic graphitizing agent to obtain a solution. The resultant solution can be cast and dried at room temperature (e.g., 15, 20, 25, 30, or 35° C.) in order to obtain the precursor composition, which can then be subjected to the polymerization step 102.

After the polymerization step 102, the resulting polymer functions as the polymerized carbonization precursor, i.e., the source of carbon upon being carbonized. The organic graphitizing agent (i.e., PAH) functions to modify the structure of the polymer precursor materials before carbonization step 103 and help the initiation and development of highly crystalline graphitized regions in the resultant mesoporous carbon material after the carbonization step 103. In other words, the graphitizing agent (PAH) promotes development of graphene structure in carbon mesoporous matrix.

Referring to the step 101, once the mixture of the phenolic resin oligomers, the templating component and the organic graphitizing agent is dried (i.e., evaporation process at room temperature), two simultaneous processes could take place, namely, parallel benzene rings alignment and micellization. The parallel benzene rings alignment is governed by formation of hydrogen bonds between benzene rings of phenolic resin and the rigid planar PAH molecules, which leads to establishment of strong π-π interactions. The strong π-π interactions give rise to a new spatial conformation for phenolic resin monomers. The formation of hydrogen bonds between benzene rings of phenolic resin and the rigid planar PAH molecules could also partially limit three-dimensional cross-linking of phenolic resin monomers during early stages of the polymerization step 102 due to the spatial constrains introduced by PAH molecules. The existence of formerly bonded and aligned phenolic resin molecules on PAH molecules as the graphitizing agent, can be expected to promote the directional nucleation and growth of the graphene layers inside mesoporous carbon matrix during the carbonization step 103.

The templating component can contain one or more block copolymers. The copolymer can be, for example, a di-block copolymer containing two chemically distinct polymeric blocks, tri-block copolymer containing three chemically distinct polymeric blocks, tetra-block copolymer containing four chemically distinct polymeric blocks, or higher block copolymers with more chemically distinguished polymeric segments. The block copolymer can be, for example, carbon-based in order that the block copolymer can be at least partially capable of volatilizing during the carbonization step 103. The block copolymer can be amphiphilic, which can contain at least two segments that possess a difference in hydrophilicity or hydrophobicity. Such block copolymers can form periodic structures by virtue of selective interactions between like domains, i.e., between hydrophobic domains and between hydrophilic domains. The block copolymer can either be a linear, a branched or a grafted block copolymer.

According to one implementation, the block copolymer can be a tri-block copolymer containing one or more polyethylene oxide (PEO) segments and one or more polypropylene oxide (PPO) segments. More preferably, the tri-block copolymer can be a poloxamer, with a minimum average molecular weight of at least 500, 800, 1000, 1200, 1500, 2000, 2500, 3000, 3500, 4000 or 4500 g/mole, and a maximum average molecular weight of 5000, 5500, 6000, 6500, 7000, 7500, 8000, 8500, 9000, 9500, 10000, 12000, 15000, or 20000 g/mole. It should be understood that a particular range can be established between any two the minimum and maximum values. The Pluronic names of several exemplary poloxamer polymers that can be used herein are as follows: Pluronic L31, Pluronic L33, Pluronic L38, Pluronic L43, Pluronic L44, Pluronic L61, Pluronic L62, Pluronic L64, Pluronic L65, Pluronic L68, Pluronic F77, Pluronic F81, Pluronic P84, Pluronic P85, Pluronic F87, Pluronic F88, Pluronic L92, Pluronic F98, Pluronic L101, Pluronic P103, Pluronic P104, Pluronic P105, Pluronic P108, Pluronic P121, Pluronic P123, and Pluronic F127. As is known to a person skilled in the art, the numbers and letters given above in the Pluronic names of the poloxamers provide information on the chemical composition of each poloxamers. For example, Pluronic F127 means a solid poloxamer possessing a PPO portion of about 3600 g/mole molecular weight, and 70 wt % PEO. Numerous other types of copolymers containing PEO and PPO blocks are possible, all of which can be applicable herein.

In one implementation, the phenolic compound or material can contain one phenol group, for example, phenol, the halophenols, the aminophenols, the hydrocarbyl-substituted phenols, naphthols, nitrophenols, hydroxyanisoles, hydroxybenzoic acids, fatty acid ester-substituted or polyalkyleneoxy-substituted phenols, phenols containing an azo linkage (e.g., p-hydroxyazobenzene), and phenol sulfonic acids (e.g., p-phenol sulfonic acid). Some general subclasses of halophenols include the fluorophenols, chlorophenols, bromophenols, and iodophenols, and their further sub-classification as, for example, p-halophenols (e.g., 4-fluorophenol, 4-chlorophenol, 4-bromophenol, and 4-iodophenol), m-halophenols (e.g., 3-fluorophenol, 3-chlorophenol, 3-bromophenol, and 3-iodophenol), o-halophenols (e.g., 2-fluorophenol, 2-chlorophenol, 2-bromophenol, and 2-iodophenol), dihalophenols (e.g., 3,5-dichlorophenol and 3,5-dibromophenol), and trihalophenols (e.g., 3,4,5-trichlorophenol, 3,4,5-tribromophenol, 3,4,5-tri?uorophenol, 3,5,6 trichlorophenol, and 2,3,5-tribromophenol). Some examples of aminophenols include 2-, 3-, and 4-aminophenol, and 3, 5 and 2, 5-diaminophenol. Some examples of nitrophenols include 2-, 3-, and 4-nitrophenol, and 2, 5- and 3,5-dinitro phenol. Some examples of hydrocarbyl-substituted phenols include the cresols, i.e., methyl phenols or hydroxytoluenes (e.g., o-cresol, m-cresol, p-cresol), the xylenols (e.g., 3,5-, 2,5-, 2,3-, and 3,4-dimethylphenol), the ethyl phenols (e.g., 2-, 3-, and 4-ethylphenol, and 3,5- and 2,5-diethylphenol), n-propyl phenols (e.g., 4-n-propylphenol), isopropyl phenols (e.g., 4-isopropylphenol), butyl phenols (e.g., 4-n-butylphenol, 4-isobutylphenol, 4-t-butylphenol, 3,5-di-t-butylphenol, 2,5-di-t-butylphenol), hexylphenols, octylphenols (e.g., 4-n octylphenol), nonylphenols (e.g., 4-n-nonylphenol), phenylphenols (e.g., 2-phenylphenol, 3-phenylphenol, and 4-phenylphenol), and hydroxycinnamic acid (p-coumaric acid). Some examples of hydroxyanisoles include 2-methoxyphenol, 3-methoxyphenol, 4-methoxyphenol, 3-t-butyl-4 hydroxyanisole (e.g., BHA), and ferulic acid. Some examples of hydroxybenzoic acids include 2-hydroxybenzoic acid (salicylic acid), 3-hydroxybenzoic acid, 4-hydroxybenzoic acid, and their organic acid esters (e. g., methyl salicylate and ethyl-4-hydroxybenzoate).

In another implementation, the phenolic compound or material can contain two phenol groups, for example, catechol, resorcinol, hydroquinone, the hydrocarbyl-linked bisphenols (e.g., bis-phenol A, methylenebisphenol, and 4,4'-dihydroxystilbene), 4,4'-biphenol, the halo-substituted diphenols (e.g., 2-haloresorcinols, 3-haloresorcinols, and 4-haloresorcinols, the halo group can be fluoro, chloro, bromo, or iodo), the amino-substituted diphenols (e.g., 2-aminoresorcinol, 3-aminoresorcinol, and 4-aminoresorcinol), the hydrocarbyl-substituted diphenols (e.g., 2,6-dihydroxytoluene, i.e., 2-methylresorcinol; 2,3-, 2,4-, 2,5-, and 3,5-dihydroxytoluene, 1-ethyl-2,6-dihydroxy benzene, caffeic acid, and chlorogenic acid), the nitro-substituted diphenols (e.g., 2- and 4-nitroresorcinol), dihydroxyanisoles (e.g., 3,5-, 2,3-, 2,5-, and 2,6-dihydroxyanisole, and vanillin), dihydroxybenzoic acids (e.g., 3,5-, 2,3-, 2,5-, and 2,6-dihydroxybenzoic acid, and their alkyl esters, and vanillic acid), and phenolphthalein.

In another implementation, the phenolic compound or material can contain three phenol groups, for example, phloroglucinol (1,3,5-trihydroxybenzene), pyrogallol (1,2, 3-trihydroxybenzene), 1,2,4-trihydroxybenzene, 5-chloro-1, 2,4-trihydroxybenzene, resveratrol (trans-3,5,4'-trihydroxystilbene), the hydrocarbyl substituted triphenols (e.g., 2,4, 6-trihydroxytoluene, i.e., methylphloroglucinol, and 3,4,5-trihydroxytoluene), the halogen-substituted triphenols (e.g., 5-chloro-1,2,4-trihydroxybenzene), the carboxy-substituted triphenols (e.g., 3,4, 5-trihydroxybenzoic acid, i.e., gallic acid or quinic acid, and 2,4,6-trihydroxybenzoic acid), the nitro-substituted triphenols (e.g., 2,4,6-trihydroxynitrobenzene), and phenol-form aldehyde resoles or novolak resins containing three phenol groups.

In yet another implementation, the phenolic compound or material contains multiple (i.e., greater than three) phenol groups. Some examples of such compounds or materials include tannin (e.g., tannic acid), tannin derivatives (e.g., ellagotannins and gallotannins), phenol-containing polymers (e.g., poly-(4-hydroxystyrene)), phenol-formaldehyde resoles or novolak resins containing at least four phenol groups (e.g., at least 4, 5, or 6 phenol groups), quercetin, ellagic acid, and tetraphenol ethane.

The cross-linkable aldehyde component can be any organic compound or material containing an aldehyde group. In one implementation, the cross-linkable aldehyde can be, for example, formaldehyde. However, there are also numerous organoaldehydes, organodialdehydes, and polyaldehydes (e.g., organotrialdehydes, organotetraaldehydes, and so on) considered herein, which may serve the same purpose.

Figure 2:
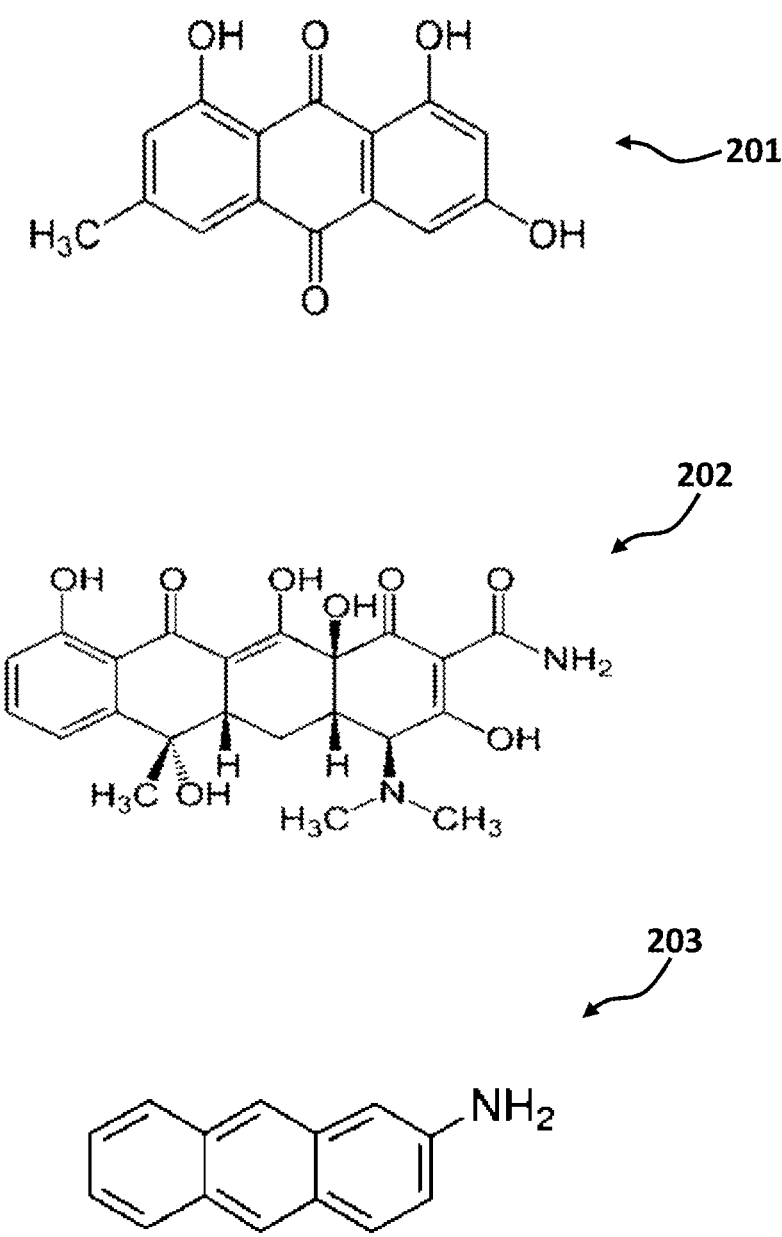
FIG. 2 illustrates molecular structures of Emodin, Tetracycline, and 2-Aminoanthracene.

The graphitizing agent can be selected from non-catalytic graphitizing agents, for example, water-soluble planar polyaromatic hydrocarbons (PAHs). Some examples of such graphitizing agents include Trihydroxyantrakynon referred as Emodin ($C_{15}H_{10}O_5$), 2-Aminoantheracene ($C_{14}H_{11}N$), Tetracycline ($C_{22}H_{24}N_2O_8$). FIG. 2 shows molecular structures of Emodin 201, Tetracycline 202, and 2-Aminoantheracene 203.

According to one implementation, the step of providing the precursor composition 101 can be carried out by first synthesizing phenolic resin oligomers using the polymer precursor components via mixing and heating the phenolic compound and the cross-linkable aldehyde component, for example, formaldehyde, in a sodium hydroxide solution at a temperature of approximately 70° C. Then, the solution can be neutralized with an acid solution, for example, hydrochloric acid, and finally the water in the resultant neutralized solution can be evaporated, for example, under vacuum in order to obtain phenolic resin oligomers; then, the phenolic resin oligomers can be mixed with the templating component and the organic graphitizing agent (e.g., Emodin, Tetracycline, 2-Aminoantheracene, or other examples of water-soluble polyaromatic hydrocarbons) to obtain a mixture. The mixture can then be, for example, dissolved in an ethanol solution. The resultant solution can be cast and dried at room temperature in order to obtain the precursor composition.

Moving on to the step of subjecting the precursor composition to a polymerization step 102, the precursor composition obtained in step 101 can be heated at a temperature of approximately 100° C. for the polymerization (i.e., thermopolymerization) to occur in order to obtain the polymerized (and optionally, cross-linked) carbonization precursor.

Moving on to the step of subjecting the carbonization precursor to a carbonization step 103, the carbonization step includes any of the conditions which cause carbonization of the carbonization precursor. Generally, in different implementations, a carbonization temperature in a range of between about 800° C. and about 1100° C. is employed for a time period of, typically, at least 1, 2, 3, 4, 5, or 6 hours and up to 7, 8, 9, 10, 11, or 12 hours, where it is understood that higher temperatures generally require shorter time periods to achieve the same result. If desired, the precursor composition, or alternatively, the carbonized material, can be subjected to a temperature high enough to produce a graphitized carbon material. Since a non-catalytic graphitization agent is used in the precursor composition, according to the teachings of the present invention, lower carbonization temperatures may also lead to the production of a graphitized carbon material. The carbonization step 103 can be conducted in an atmosphere substantially devoid of oxygen, e.g., typically under an inert atmosphere. Some examples of inert atmospheres include nitrogen and the noble gases (e. g., helium or argon).

In particular implementations, the carbonization precursor can be subjected to an initial lower temperature carbonization step followed by a higher temperature carbonization step. The initial carbonization step may employ a temperature range of about 300° C. and 400° C., while the subsequent carbonization step may employ a temperature range of between about 800° C. and about 1100° C., provided that the temperature of the initial carbonization step is less than the temperature of the subsequent carbonization step. In addition, each carbonization step can employ any of the exemplary time periods given above. According to the teaching of the present disclosure, a highly ordered mesoporous carbon material may be obtained at a carbonization temperature at or lower than about 900° C.

In an alternative implementation, the temperature can be gradually increased during the carbonization step between any of the temperatures given above, or between room temperature (e.g., 15, 20, 25, 30, or 35° C.) and any of the temperatures given above. In different implementations, the first gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, 30° C./min, 40° C./min, or 50° C./min, or any suitable range between any of these values. The gradual temperature increase can also include one or more periods of residency at a particular temperature, and/or a change in the rate of temperature increase.

The formation of rather long-range ordered graphene layers for mesoporous materials prepared pursuant to the teachings of the present disclosure can be considered as at least partially governed by the initial spatial planar alignments of benzene rings of phenolic resin monomers and those of PAHs molecules. Amongst the synthesized samples, high specific surface area (~620 m2/g) and electrical conductivity (~6.25 S/cm) were obtained for mesoporous carbon materials synthesized using polyaromatic hydrocarbons as non-metallic graphitizing agents. Such high specific surface areas and electrical conductivity potentially promises wide range of interesting applications for mesoporous carbon materials.

Examples have been set forth below for the purpose of illustration and to describe certain specific implementations of the present disclosure. However, the scope of this disclosure is not to be in any way limited by the examples set forth herein.

EXAMPLES

Example 1

Synthesis of Mesoporous Carbon (MC) Materials without a Graphitizing Agent

In this example, synthesis of mesoporous carbon materials (MC-FDU15) without using a non-catalytic graphitizing agent (i.e., PAH) is described. Here, 2.5 g of resorcinol formaldehyde (RF) resin and 0.5 g of Pluronic F127 are dissolved in 10 g of ethanol and are stirred for 2 hours to obtain a clear solution. The resultant clear solution is then transferred to a Petri dish and is left to be dried at room temperature for 8 hours to obtain a precursor composition. The precursor composition is then subjected to a polymerization step (i.e., thermopolymerization) at 100° C. for 24 hours in order to obtain a polymerized (and optionally, cross-linked) carbonization precursor. The carbonization precursor is then carbonized under nitrogen atmosphere at 350° C. for 2 hours at a heating rate of 1° C./min followed by further treatment at 900° C. for 2 hours at a heating rate of 1° C./min to obtain a mesoporous carbon material, which is labeled herein as "MC-FDU15".

Example 2

Synthesis of Mesoporous Carbon (MC) Materials Using Emodin as a Non-Catalytic Graphitizing Agent In this example, synthesis of mesoporous carbon materials (MC-FDU15) using Emodin as a graphitizing agent in the synthesis process is described. Here, 2.5 g of resorcinol formaldehyde (RF) resin and 0.5 g of Pluronic F127 are dissolved in 10 g of ethanol and are stirred for 2 hours, while 4.7 mg of an ethanolic solution of Emodin is being added dropwise to the mixture to obtain a first solution. The first solution is then transferred to a Petri dish and is left to be dried at room temperature for 8 hours to obtain a precursor composition. The precursor composition is then subjected to a polymerization step (i.e., thermopolymerization) at 100° C. for 24 hours in order to obtain a polymerized (and optionally, cross-linked) carbonization precursor. The carbonization precursor is then carbonized under nitrogen atmosphere at 350° C. for 2 hours at a heating rate of 1° C./min, followed by further treatment at 900° C. for 2 hours at a heating rate of 1° C./min to obtain a mesoporous carbon material, which is labeled herein as "MC-Emodin".

Example 3

Synthesis of Mesoporous Carbon (MC) Materials Using 2-Aminoanthracene as a Non-Catalytic Graphitizing Agent In this example, synthesis of mesoporous carbon materials (MC-FDU15) using 2-Aminoanthracene as a graphitizing agent is described. Here, 2.5 g of resorcinol formaldehyde (RF) resin and 0.5 g of Pluronic F127 are dissolved in 10 g of ethanol and are stirred for 2 hours, while 5 mg of an ethanolic solution of 2-Aminoanthracene is being added dropwise to the mixture to obtain a first solution. The first solution is then transferred to a Petri dish and is left to be dried at room temperature for 8 hours to obtain a precursor composition. The precursor composition is then subjected to a polymerization step (i.e., thermopolymerization) at 100° C. for 24 hours in order to obtain a polymerized (and optionally, cross-linked) carbonization precursor. The carbonization precursor is then carbonized under nitrogen atmosphere at 350° C. for 2 hours at a heating rate of 1° C./min followed by further treatment at 900° C. for 2 hours at a heating rate of 1° C./min to obtain a mesoporous carbon material, which is labeled herein as "MC-Aminoanthracene".

Example 4

Synthesis of Mesoporous Carbon (MC) Materials Using Tetracycline as a Non-Catalytic Graphitizing Agent In this example, synthesis of mesoporous carbon materials (MC-FDU15) using Tetracycline as a graphitizing agent is described. Here, 2.5 g of resorcinol formaldehyde (RF) resin and 0.5 g of Pluronic F127 are dissolved in 10 g of ethanol and are stirred for 2 hours, while 10 mg of an ethanolic solution of Tetracycline is being added dropwise to the mixture to obtain a first solution. The first solution is then transferred to a Petri dish and is left to be dried at room temperature for 8 hours to obtain a precursor composition. The precursor composition is then subjected to a polymerization step (i.e., thermopolymerization) at 100° C. for 24 hours in order to obtain a polymerized (and optionally, cross-linked) carbonization precursor. The carbonization precursor is then carbonized under nitrogen atmosphere at 350° C. for 2 hours at a heating rate of 1° C./min followed by further treatment at 900° C. for 2 hours at a heating rate of 1° C./min to obtain a mesoporous carbon material, which is labeled herein as "MC-Tetracycline".

Example 5

Transition Electron Microscopy (TEM) Characterization

In this example, the produced carbon materials (hereinafter "samples") synthesized as described in more detail in examples 1-4 were dispersed in ethanol and were dropped onto copper grids. TEM images and selected-area electron diffraction (SAED) patterns of the samples were obtained on a JEOL JEM-2010 (HT) transmission electron microscope at 200 kV. Moreover, high-resolution transmission electron microscopy (HRTEM) images of the samples were obtained on a JEOL JEM-2010 FET (UHR) transmission electron microscope at 200 kV. TEM and high resolution transition electron microscope (HRTEM) data analysis were carried out using a digital micrograph software.

Figure 3A:
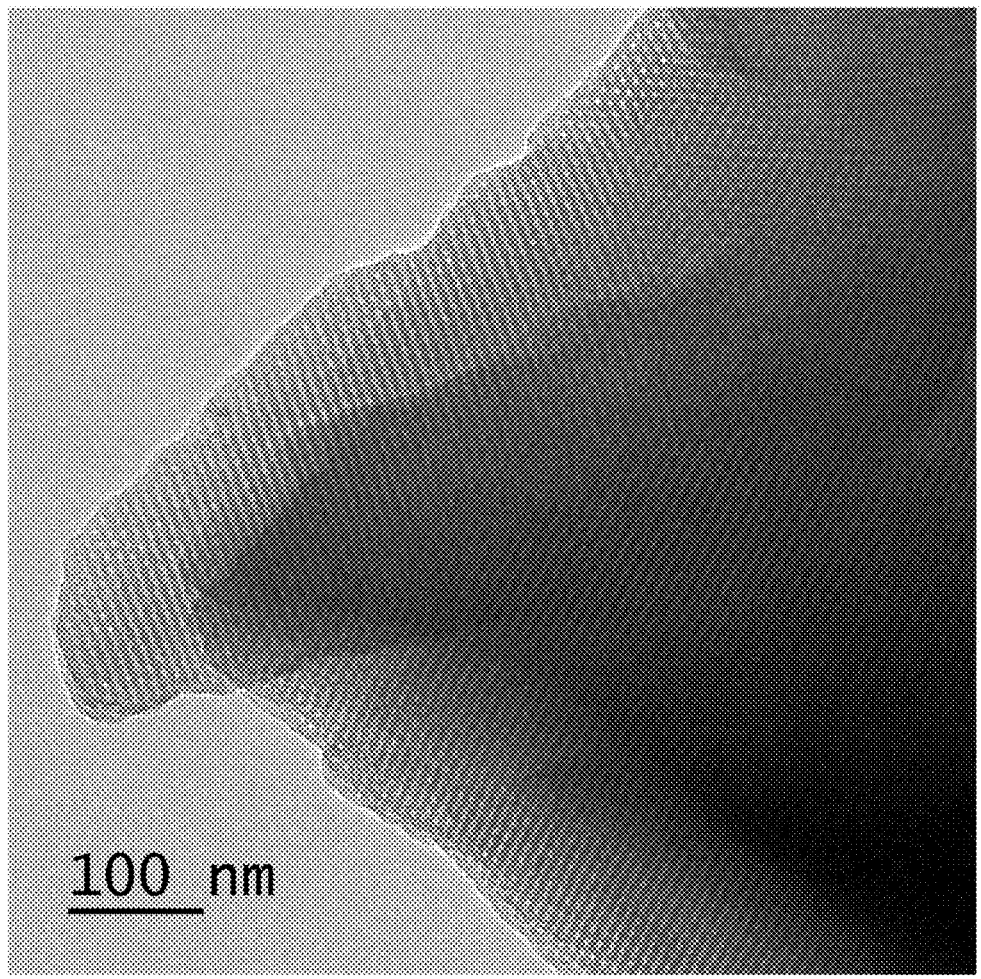
FIG. 3A is a transmission electron microscope (TEM) bright field micrograph of the MC-FDU15 sample prepared as described in more detail in connection with example 1, with an image resolution of 100 nm.

FIG. 3A illustrates TEM bright field micrograph of the MC-FDU15 sample prepared without adding a PAH, the preparation of which is described above in example 1. FIG. 3A shows ordered 2D hexagonal arrays of mesoporous channels of the MC-FDU15. The cell parameter estimated from the TEM micrographs is approximately 8.5 nm.

Figure 3B:
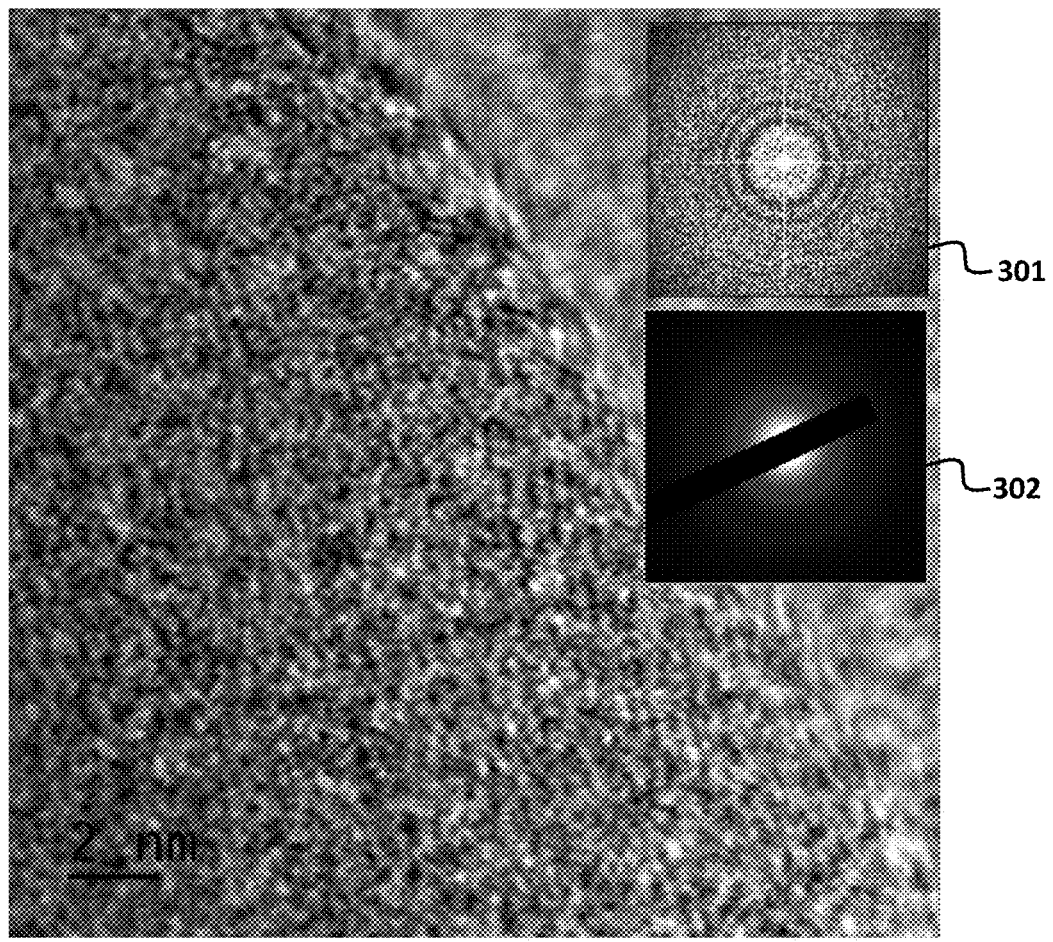
FIG. 3B illustrates a transmission electron microscope (TEM) bright field micrograph of the MC-FDU15 sample prepared as described in more detail in connection with example 1, with an image resolution of 2 nm; its corresponding fast Fourier transform (FFT) pattern (Upper top-right inset); and selected area electron diffraction (SAED) pattern (Lower top-right inset).

FIG. 3B illustrates TEM micrograph of the same MC-FDU15 sample of FIG. 1A, but with an image resolution of 2 nm. Fast Fourier transform (FFT) pattern 301 and selected area electron diffraction (SAED) pattern 302 are further illustrated on the top right corner of FIG. 3B. The amorphous nature of the MC-FDU15 powder could be clearly confirmed by the micrographs obtained with higher magnification as illustrated in FIG. 3B as well as the relevant selected area diffraction (SAED) pattern 302 for this sample.

Figure 4A:
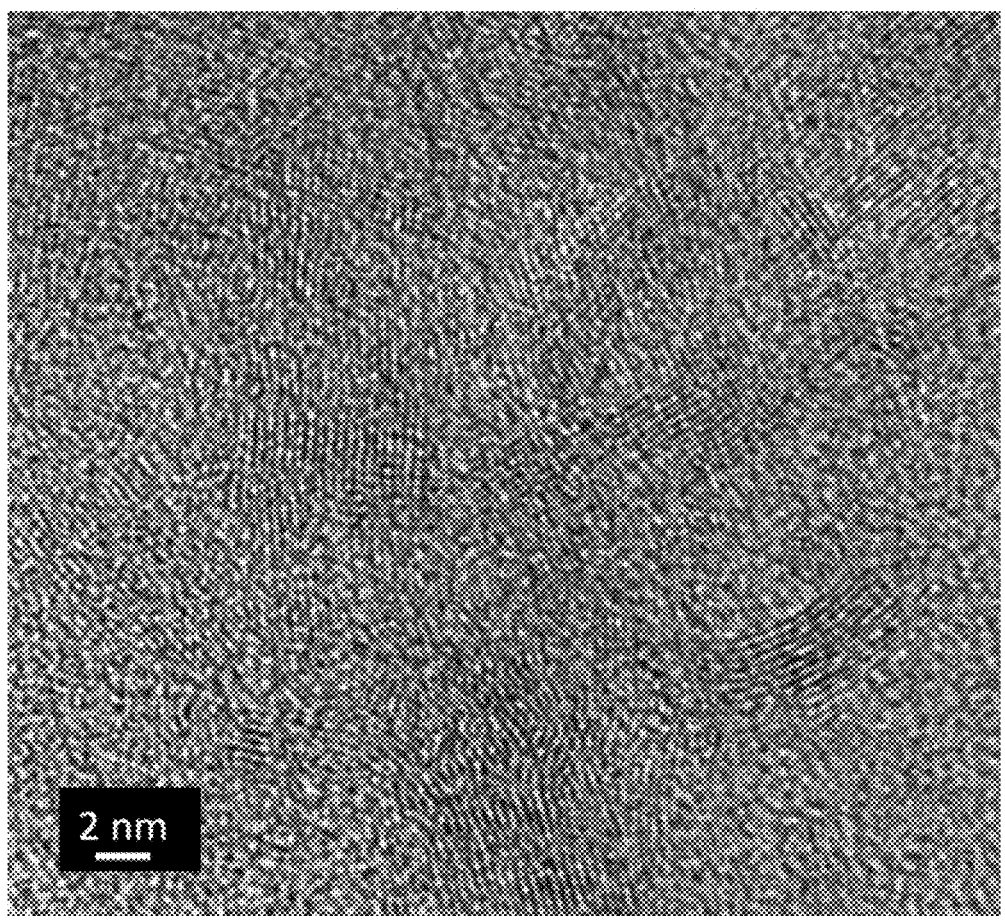
FIGS. 4A-4C illustrate transmission electron microscope (TEM) micrographs of example MC-Aminoanthracene (FIG. 4A), MC-Emodin (FIG. 4B), and MC-Tetracycline (FIG. 4C) samples prepared as described in more detail in connection with examples 2-4.
Figure 4B:
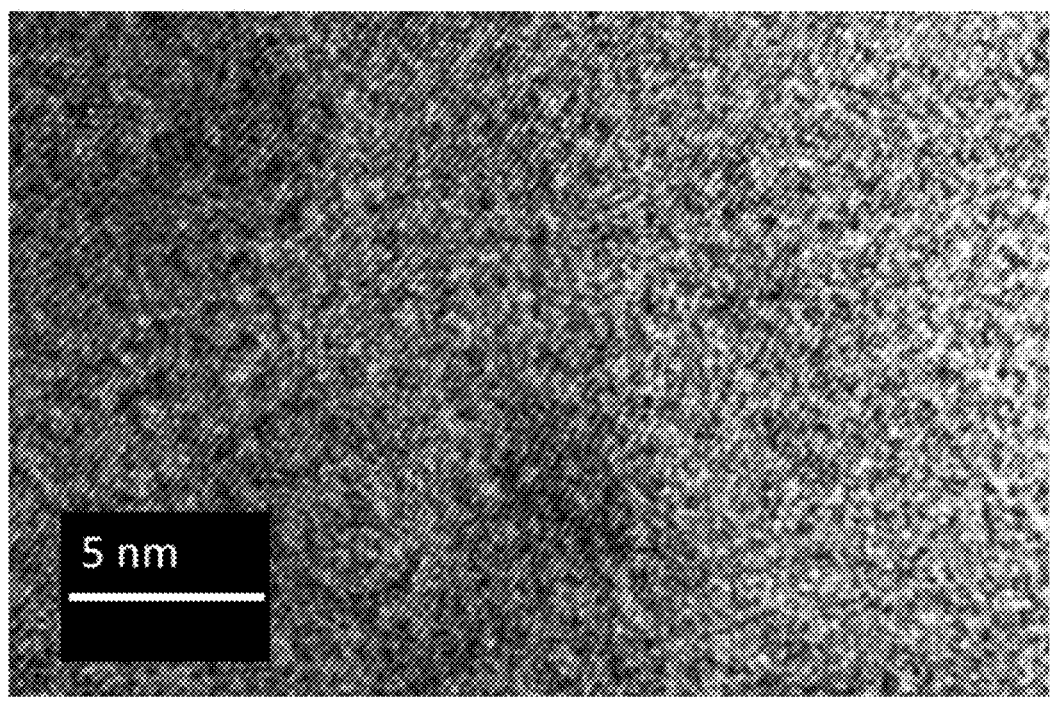
Figure 4C:
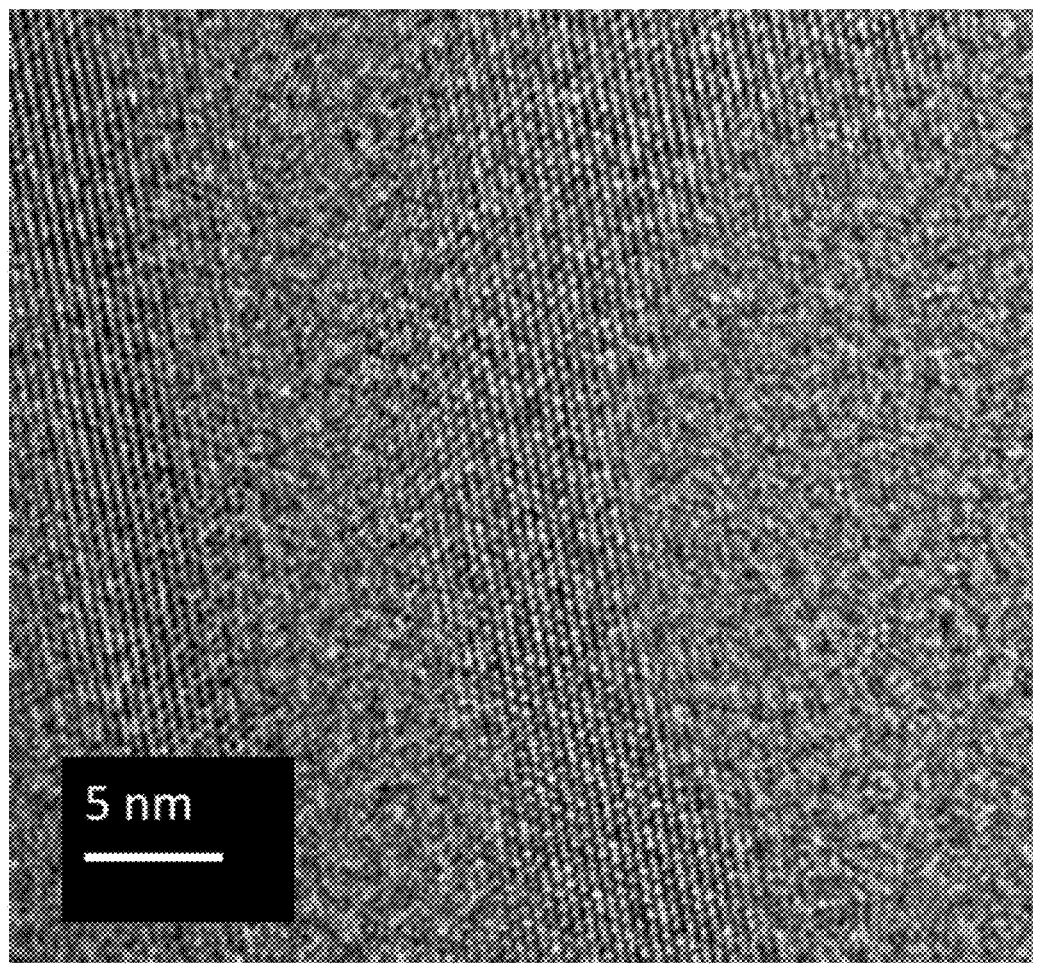

FIGS. 4A-4C illustrate TEM micrographs of MC-Aminoanthracene (FIG. 4A), MC-Emodin (FIG. 4B), and MC-Tetracycline (FIG. 4C) which are prepared as described above in examples 2-4. TEM study of the mesoporous carbon samples containing PAH molecules (i.e., MC-Emodin, MC-Aminoanthracene, and MC-Tetracycline), as illustrated by FIGS. 4A-4C reveals different microstructures and degree of crystallinity compared to the MC-FDU15 sample prepared without adding a PAH. Referring to FIGS. 4A-4C, for all of the MC-PAH samples prepared as described above in examples 2-4, the existence of highly ordered regions are highlighted by the observed carbon lattice fringes of 335±10 pm attributed to d002 planes of graphite phase. Based on the TEM examinations, although, the degree of crystallinity of the MC-PAH samples (i.e., MC-Emodin, MC-Aminoanthracene, and MC-Tetracycline) were found rather varying, the significant role of PAH addition on the development of highly crystalline graphitized regions could be clearly noticed for all of the MC-PAH samples. Furthermore, the formation of rather long range ordered graphitized regions for all of the prepared MC-PAH samples clearly differentiates them from the short range ordered graphitized regions normally observed in case of carbonaceous materials of turbostratic structure.

Figure 5A:
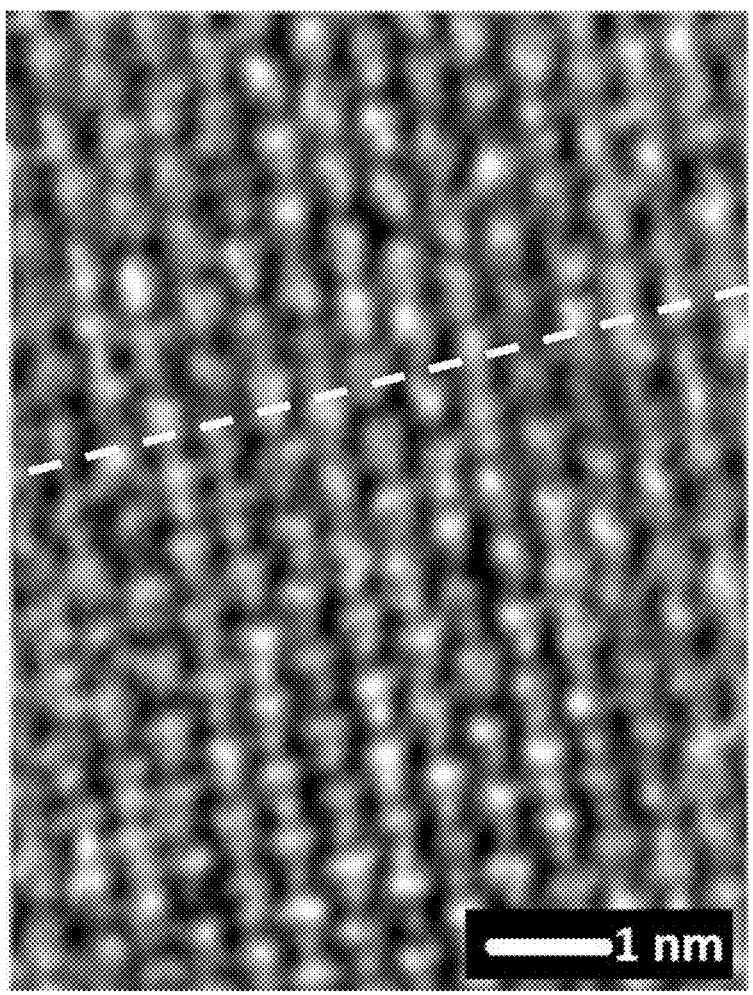
FIG. 5A illustrates transmission electron microscope (TEM) image of the synthesized mesoporous MC-Tetracycline sample prepared as described in more detail in connection with example 4 with ultra-high magnification of 0.1 nm.
Figure 5B:
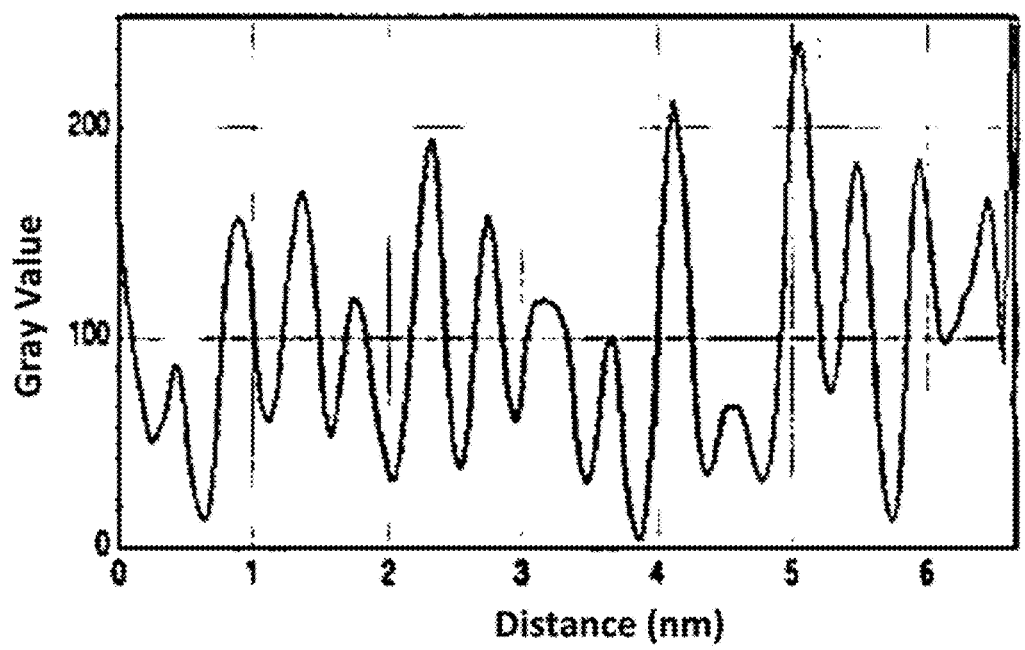
FIG. 5B shows z-axis profile along the white dashed line shown in FIG. 5A.
Figure 5C:
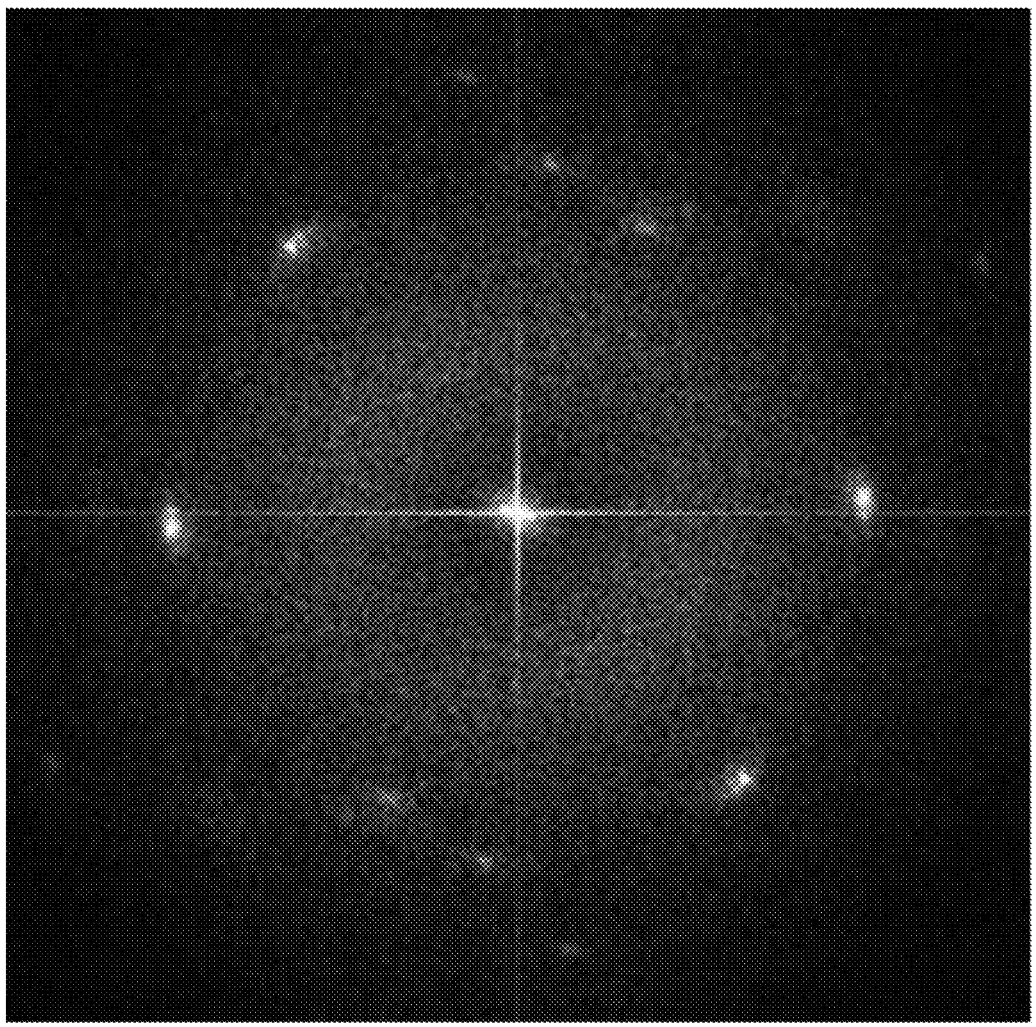
FIG. 5C illustrates corresponding fast Fourier transform (FFT) pattern of the transmission electron microscope (TEM) image shown in FIG. 5A.

FIG. 5A illustrates TEM image of the synthesized mesoporous MC-Tetracycline sample prepared as described above in example 4 with ultra-high magnification (0.1 nm). FIG. 5A clearly shows AB Bernal stacking of 2D carbon planes. FIG. 5B shows z-axis profile, which is prepared by plotting the gray contrast intensity as a function of distance (with bright contrast as zero) along the white dashed line shown in FIG. 5A. The z-axis profile confirms the existence of uniformly stacked layers of similar distances. FIG. 5C illustrates the corresponding fast Fourier transform (FFT) pattern of the TEM image shown in FIG. 5A. The FFT pattern shows spots of six-fold symmetry (hexagonal) stemmed from the presence of preferential carbon atomic arrangements. The detailed HRTEM microstructural studies carried out on all of the prepared MC-PAH samples can also confirm the role of PAH addition on the initiation and development of such highly ordered graphitized regions.

Figure 6A:
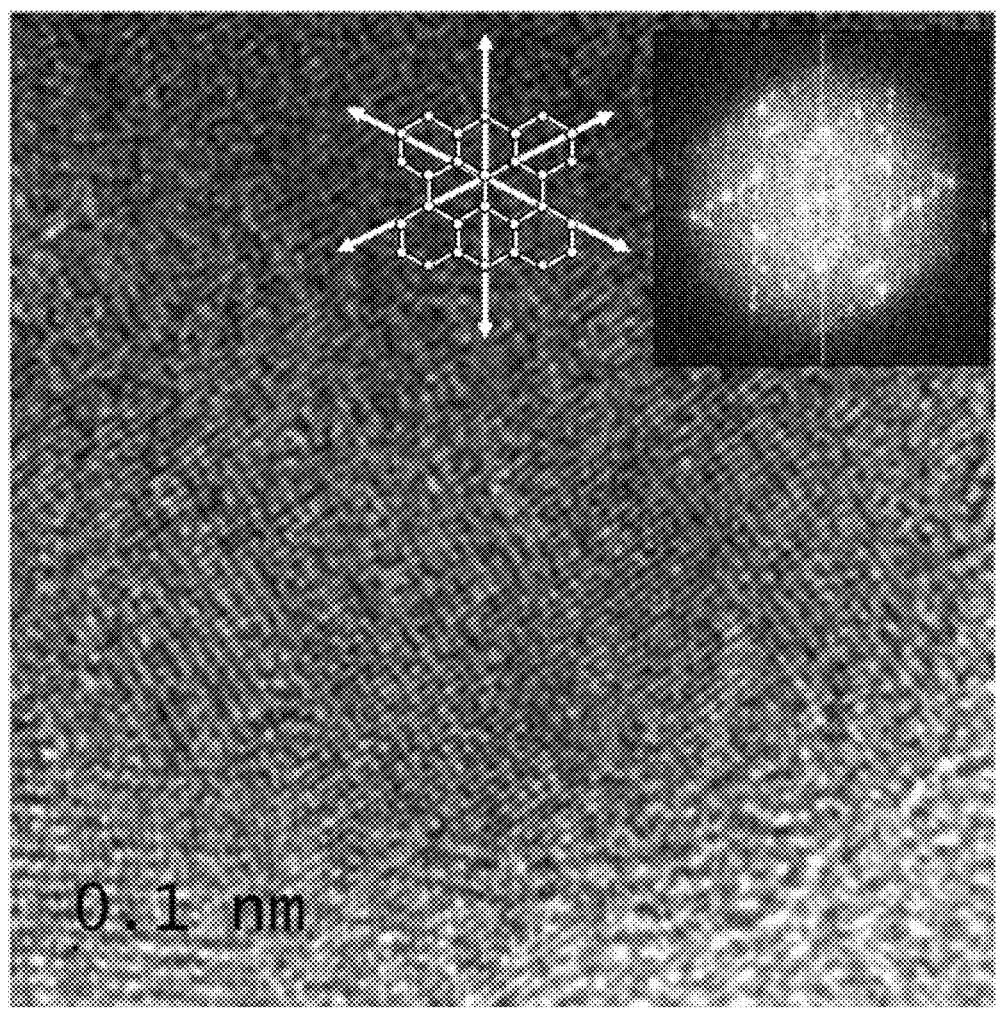
FIG. 6A illustrates high-resolution transmission electron microscopy (HRTEM) micrographs of the MC-Emodin sample prepared as described in more detail in connection with example 2, and its corresponding FFT pattern (top-right inset).

FIG. 6A illustrates HRTEM micrographs of the MC-Emodin sample prepared as described in detail in example 2, and its corresponding FFT pattern, which is illustrated as an inset in the top right corner of FIG. 6A. The formation of in-plane hexagonal carbon rings and graphene structure in residual amorphous carbon matrix was identified by HRTEM micrographs and its corresponding FFT pattern obtained from the edge of the powder sample.

The obtained FFT pattern for MC-Emodin sample, which is illustrated as an inset in the top right corner of FIG. 6A revealed a set of distinct spots resembling the shape of a star, The distinct spots were a highlighting of the arrangement of carbon atoms in honeycomb pattern, justifying the existence of highly ordered graphene structure along c-axis normally appearing in case of single layer graphene of low structural defects for the studied regions.

Figure 6B:
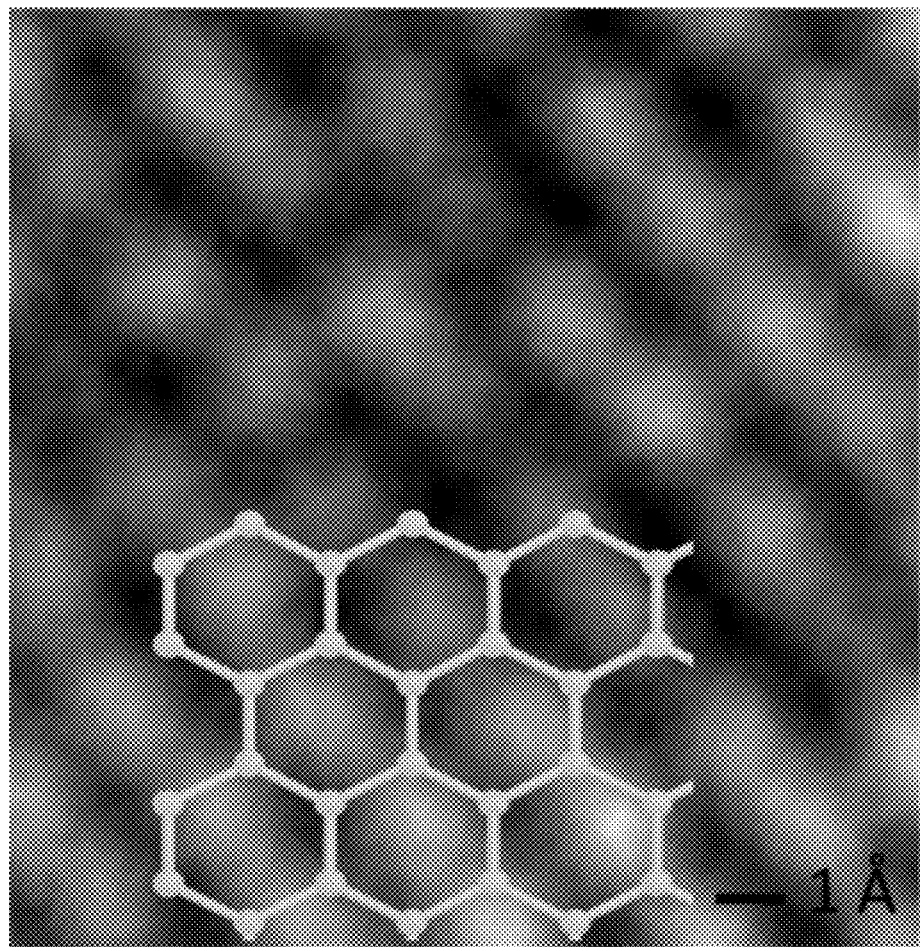
FIG. 6B illustrates high-resolution transmission electron microscopy (HRTEM) micrographs of the MC-Emodin sample prepared as described in more detail in connection with example 2 with ultra-high magnification.

FIG. 6B illustrates HRTEM micrographs of the MC-Emodin sample with ultra-high magnification. As is shown in FIG. 6B, the existence of honeycomb arrangement of carbon rings related to graphene structure could be observed by adjusting the incident transition electrons perpendicular to the plane of crystalline regions for the MC-Emodin sample, which was common to all of the MC-PAH samples prepared as described above in examples 2-4.

Example 6

Raman Spectroscopy Characterization

The formation of graphene layers related to graphitized regions inside carbonaceous amorphous matrix for MC-PAH samples can be supported by Raman spectroscopy. In this example, the Raman spectra were acquired using a Raman spectrometer (JobinYvon Co.) model HR800 employing a 10 mW helium/neon laser at 632.8 nm. The integration time for each scan was 5 seconds, and the intensity of Raman peaks were extracted from the maximum values after baseline subtraction over corresponding spectral range.

Figure 7:
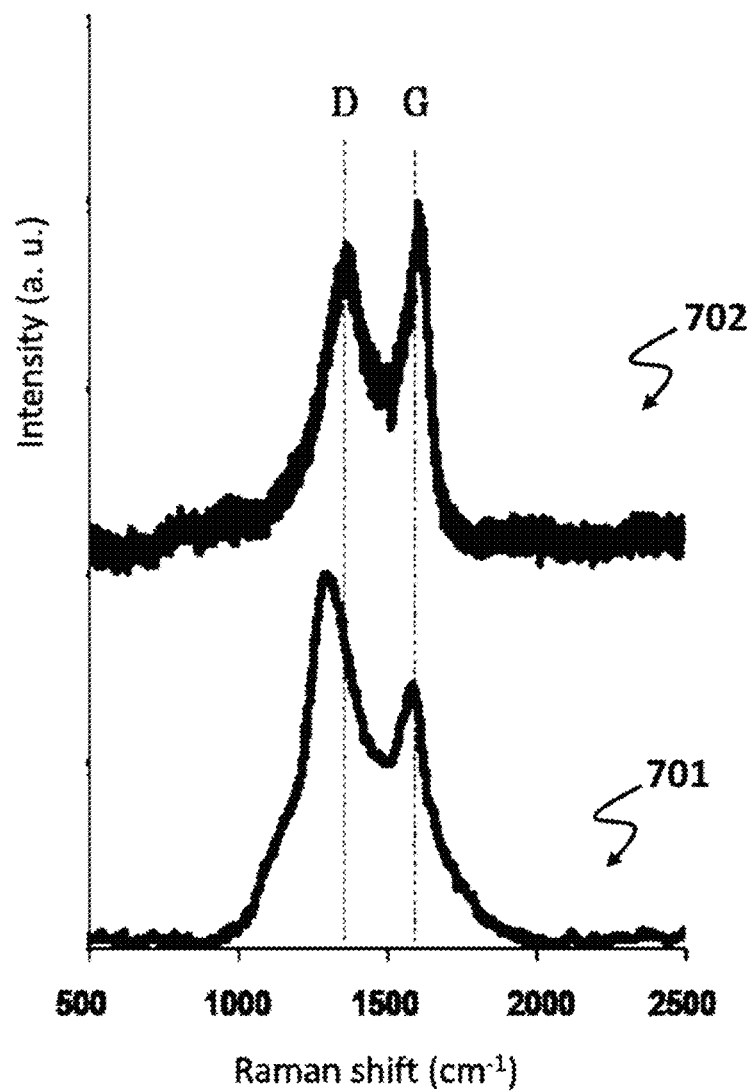
FIG. 7 illustrates Raman spectra of the MC-FDU15 sample prepared as described in more detail in connection with example 1 and Raman spectra of MC-Emodin sample prepared as described in more detail in connection with example 2.

FIG. 7 illustrates Raman spectrum of the MC-FDU15 sample (curve 701), prepared as described in example 1 and Raman spectrum of MC-Emodin sample (curve 702), prepared as described in example 2. As can be seen in this figure, Raman spectra 701 and 702 display strong distinct D (1,350 cm 1) and G (1,582 cm 1) bands identical to carbonaceous materials. The intensity ratio of the D and G bands (ID/IG), a common measure to evaluate the quality of carbon materials, was 1.48 and 0.65 for the MC-FDU15 and MC-Emodin samples, respectively, suggesting a noticeable improvement in microstructure and crystalline region density for the latter in close agreement with HRTEM results shown in FIG. 6A. Table 1 reports the variation of the magnitudes of ID/IG ratios for various MC-PAH samples compared to that of the MC powder which is prepared as described in example 1.

TABLE 1

The magnitudes of the ID/IG ratios for all of the prepared samples.

| Sample | FDU-15 | MC-PAH samples | | |
|---|---|---|---|---|
| | | Teracycline | Emodin | Aminoantheracene |
| $I_D/I_G$ | 1.48 | 0.7 | 0.65 | 0.75 |

Example 7

X-Ray Photoelectron Spectroscopy (XPS) Characterization

Figure 8A:
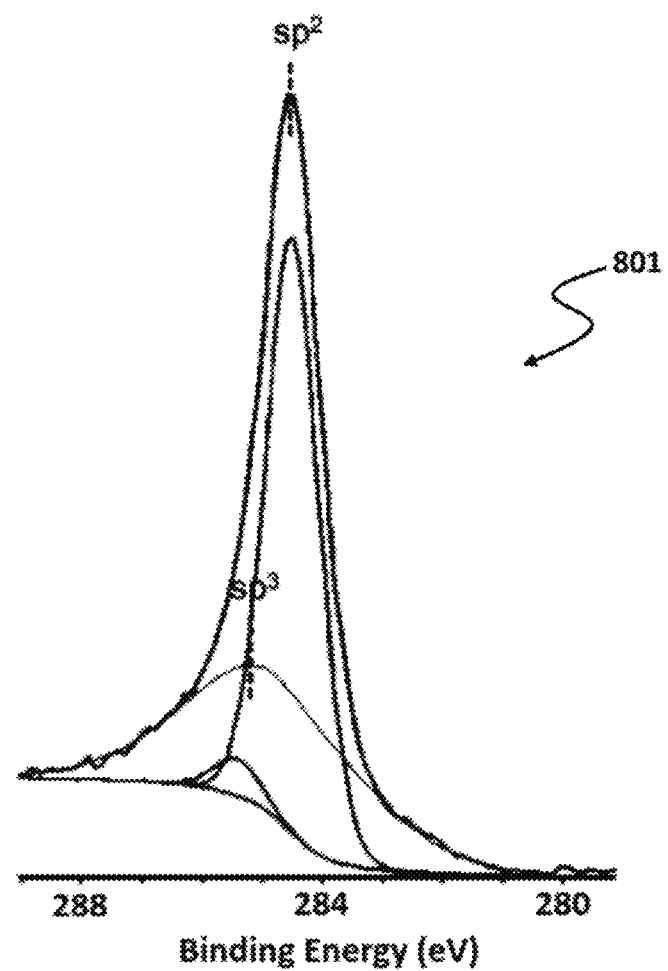
FIGS. 8A-8B illustrate high-resolution core-level x-ray photoelectron spectroscopy (C1S XPS) spectrum of MC-Emodin sample prepared as described in example 2 (FIG. 8A) and MC-Tetracycline sample prepared as described in example 4 (FIG. 8B).
Figure 8B:
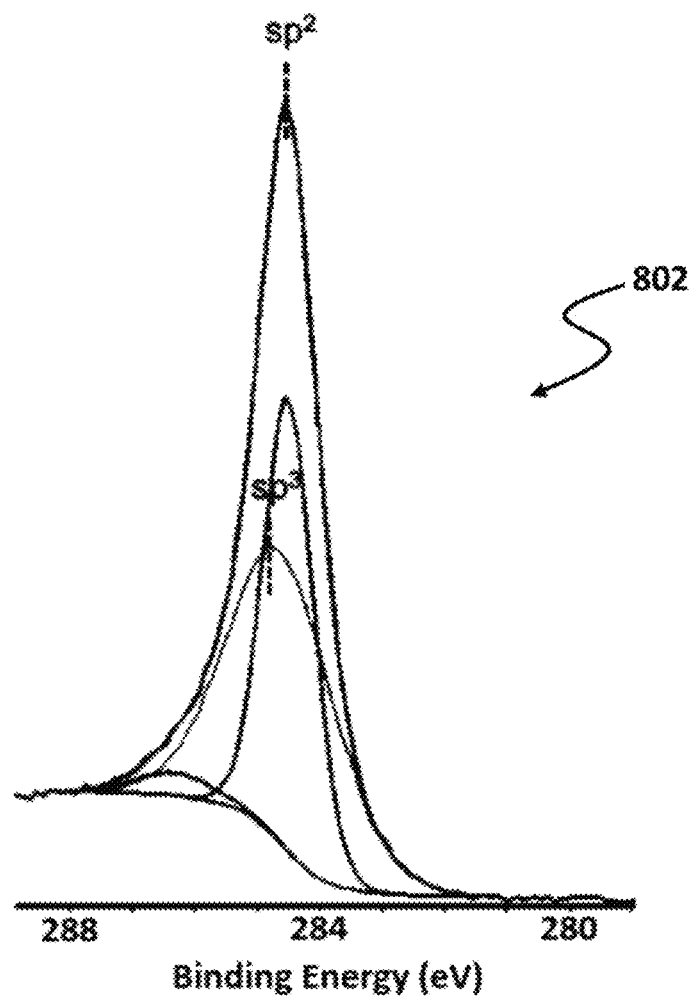

In this example, XPS analysis was carried out with Sigma probe VG Scientifics equipped with monochromatic Al—Kα source, pass energy of 1.48 eV and a step size of 0.1 eV. The incident photon energy was calibrated by measuring the Au 4f and C1s (from diamond) photoelectron core level. The XPS peaks were fitted with Gaussian and Lorentzian character of 20% and 80%, respectively. The $sp^3$ peak was fitted allowing both the full width at half maximum (FWHM) and the binding energy to vary, whilst the $sp^2$ peak had a variable FWHM but a position fixed at 284.7 eV. The study of hybridization state of carbon atoms using high-resolution x-ray photoelectron spectroscopy (XPS) and high-resolution core-level C1S XPS spectrum also approved the existence of highly graphitized regions FIGS. 8A and 8B illustrate high-resolution core-level C1S XPS spectrum of MC-Emodin sample (FIG. 8A) and MC-Tetracycline sample (FIG. 8B). Referring to FIGS. 8A and 8B, spectrum of MC-Emodin sample 801 and spectrum of MC-Tetracycline sample 802 show narrow peak distributions at 284.7 eV and 285.8 eV. The narrow peak distributions at 284.7 eV correspond to $sp^2$ hybridized carbon bonding of the aromatic rings and the peaks at 285.8 eV corresponds to $sp^3$ bonded carbons. The relatively high sp2/sp3 intensity ratios obtained for MC-Emodin and MC-tetracycline samples demonstrate the existence of highly graphitized regions within MC-PAH samples. Moreover, as can be found by comparing the obtained peaks with those of diamond and graphite, the FWHM of both the $sp^3$ and the $sp^2$ peaks of MC-PAH samples tend to be wider than those of diamond and graphite. This can be attributed to regions within the mesoporous carbon powders with mixed $sp^2$ and $sp^3$ bonding characteristics. One of the results obtained from the XPS data is the $Isp^2/Isp^3$ ratio which clearly correlates to hybridization ratio of carbon atoms. $Isp^2/Isp^3$ ratio highlights the degree of graphitization and density of crystalline regions. The magnitude of this ratio was 1.1 for MC-Emodin, 0.724 for MC-tetracycline and 0.37 for MC samples, indicating a noticeable improvement in number of carbon atoms at $sp^2$ hybridization state compared to that of $sp^3$. The magnitude of the $sp^2$ and $sp^3$ peaks broadening is considered as another sign of structural ordering. The magnitudes of FWHM related to $sp^2$ and $sp^3$ peaks were 0.73 to 2.4 and 1.56 to 2.87, for MC-Emodin and MC-Tetracycline, respectively. This was in close agreement with the Raman data discussed in connection with example 6, as well.

Example 8

Electrical Conductivity

The electrical conductivity of the samples prepared as described in more detail in examples 1-4 were measured by a four-point probe technique using tungsten probes in a Keithley™ 237 Source Meter under voltage-source testing mode. The measured voltage was adjusted in the range of 10 mV to 10 V. The corresponding current was measured and recorded across the two outer probes. All samples were formed with a cylindrical shape using uniaxial hydraulic press before the experiment.

The magnitudes of the electrical conductivities of the prepared samples are reported in table 2. As is reported in this table, the magnitude of the electrical conductivity of the MC-FDU15 sample was 0.001 S·cm$^{-1}$. However, the electrical conductivity was dramatically higher for the MC-PAH sample, (i.e., 6.25 S·cm$^{-1}$ for MC-Emodin, 0.9 for MC-Tetracycline and 0.3 for MC-Aminoanthracene). Such a high electrical conductivity obtained for MC-PAH samples can also be considered an evidence of the presence of graphene layers in the mesoporous matrix of the MC-PAH samples.

For the MC samples prepared as described in examples 1-4, the overall conductivity of the sample is influenced by the volume percent contribution of the conductivities of the crystalline regions comprised of graphene layers (isolated/interconnected) and that of the amorphous turbostratic matrix.

TABLE 2

Four-point probe electrical conductivity measurement results of the carbon mesoporous samples.

| Sample | FDU-15 | MC-PAH | | |
|---|---|---|---|---|
| | | Tetracycline | Emodin | Aminoanthracene |
| Conductivity (S/cm) | 0.001 | 0.9 | 6.25 | 0.3 |

The formation of grain boundaries and the presence of impurity atoms in the structure of crystalline carbon networks can adversely affect the total electrical conductivity of the samples. Furthermore, different structural defects can disrupt the $sp^2$ delocalization of π electrons and effectively scatter the charge carriers, forming highly resistive grain boundaries. Other defects such as wrinkles, folds, tears and cracks can also lead to a disrupted path of carrier transport, affecting the electrical resistivity.

Example 9

Brunauer-Emmett-Teller (BET) Characterization

Surface area determination and pore volume and size analysis were performed by Brunauer-Emmett-Teller (BET)

method using Micromeritics™ ASAP-2000 nitrogen absorption analyzer. All prepared samples according to examples 1-4 were heated to 150° C. under vacuum ($10^{-5}$ Torr) for 24 h to remove all the adsorbed species before the experiment. Table 3 reports Summary of $N_2$ adsorption/desorption result of MC samples. As reported in this table, MC-PAH samples exhibit higher specific surface area and average pore radiuses. This increase in the specific surface areas and average pore radiuses can be a result of high degree of graphitization in the presence of graphitization agents (i.e., PAH molecules).

TABLE 3

Summary of $N_2$ adsorption/desorption result of MC samples.

| Sample | Surface area [$m^2\,g^{-1}$] | Total pore volume ($p/p_0 = 0.993$) [$cm^3\,g^{-1}$] | Average pore radius [nm] |
|---|---|---|---|
| MC-Emodin | 625 | 0.36 | 2.2068 |
| MC-Tetracycline | 599.24 | 0.3275 | 2.1859 |
| MC-Aminoanthracene | 639.96 | 0.3305 | 2.0656 |
| MC-FDU15 | 602 | 0.31 | 2.048 |

The method for the synthesizing or fabricating ordered mesoporous carbon materials described in this disclosure can be utilized to produce highly conductive mesoporous carbon materials. Water-soluble PAHs as graphitizing agents, as is described in more detail in connection with the examples above, can persuade development of graphene structure in carbon mesoporous matrix as evident by HRTEM, Raman and, XPS and electrical conductivity measurements.

What is claimed is:

1. A method for fabricating a mesoporous carbon material, the method comprising:
   providing a precursor composition, the composition comprising: (i) a templating component including a block copolymer, (ii) a phenolic compound, (iii) a cross-linkable aldehyde component, and (iv) a water-soluble polyaromatic hydrocarbon (PAH);
   subjecting the precursor composition to a polymerization step to form a polymerized carbonization precursor; and
   subjecting the polymerized carbonization precursor to a carbonization step to convert the polymerized carbonization precursor to a mesoporous carbon material,
   wherein the block copolymer comprises a tri-block copolymer.

2. The method according to claim 1, wherein the phenolic compound is selected from the group consisting of phenolic compounds having one phenolic group, phenolic compounds having two phenolic group, phenolic compounds having three phenolic group, and combinations thereof.

3. The method according to claim 1, wherein the cross-linkable aldehyde component includes an organic compound or material containing an aldehyde group.

4. The method according to claim 1, wherein the cross-linkable aldehyde component is formaldehyde.

5. The method according to claim 1, wherein the cross-linkable aldehyde component is selected from the group consisting of organoaldehydes, organodialdehydes, polyaldehydes, and combinations thereof.

6. The method according to claim 1, wherein the cross-linkable aldehyde component comprises formaldehyde.

7. The method according to claim 1, wherein the PAH is selected from the group consisting of 6-methyl-1,3,8-trihydroxyanthraquinone, Tetracycline, 2-Aminoantheracene, or a combination thereof.

8. The method according to claim 1, wherein the step of providing a precursor composition includes steps of:
   synthesizing phenolic resin oligomers using the phenolic compound and the cross-linkable aldehyde;
   mixing the phenolic resin oligomers with the templating component and the PAH to obtain a mixture; and
   casting and drying the mixture to obtain the precursor composition.

9. The method of claim 8, wherein the method further comprises dissolving the mixture in an ethanol solution, prior to casting and drying.

10. The method of claim 8, wherein synthesizing the phenolic resin oligomers comprises:
    mixing and heating the phenolic compound and the cross-linkable aldehyde component in a sodium hydroxide solution;
    neutralizing the solution with an acid solution; and
    evaporating water from the neutralized solution to obtain the phenolic resin oligomers.

11. The method according to claim 1, wherein the polymerization step includes thermopolymerizing at a temperature of at least 100° C.

12. The method according to claim 1, wherein the carbonization step comprises heating at a temperature of at least 300° C. for at least 1 hour.

13. The method according to claim 1, wherein the carbonization step comprises heating at a temperature of about 900° C. for at least 2 hours.

14. The method according to claim 1, wherein the carbonization step includes an initial lower temperature carbonization step, followed by a higher temperature carbonization step.

15. The method according to claim 1, wherein the carbonization step comprises:
    heating at a temperature of about 350° C. for at least 1 hour; and
    heating at a temperature of about 900° C. for at least 1 hour.

16. The method of claim 1, wherein the carbonization step is performed in an atmosphere substantially devoid of oxygen.

17. The method of claim 1, wherein the mesoporous carbon material is an ordered mesoporous carbon material.

18. A method for fabricating a mesoporous carbon material, the method comprising:
    providing a precursor composition, the composition comprising: (i) a templating component including a block copolymer, (ii) a phenolic compound, (iii) a cross-linkable aldehyde component, and (iv) a water-soluble polyaromatic hydrocarbon (PAH);
    subjecting the precursor composition to a polymerization step to form a polymerized carbonization precursor; and
    subjecting the polymerized carbonization precursor to a carbonization step to convert the polymerized carbonization precursor to a mesoporous carbon material,
    wherein the PAH is selected from the group consisting of 6-methyl-1,3,8-trihydroxyanthraquinone, Tetracycline, 2-Aminoantheracene, or a combination thereof.

19. A method for fabricating a mesoporous carbon material, the method comprising:
    providing a precursor composition, the composition comprising: (i) a templating component including a block copolymer, (ii) a phenolic compound, (iii) a cross-linkable aldehyde component, and (iv) a water-soluble polyaromatic hydrocarbon (PAH);

subjecting the precursor composition to a polymerization step to form a polymerized carbonization precursor; and subjecting the polymerized carbonization precursor to a carbonization step to convert the polymerized carbonization precursor to a mesoporous carbon material, wherein the step of providing a precursor composition includes steps of:

synthesizing phenolic resin oligomers using the phenolic compound and the cross-linkable aldehyde;

mixing the phenolic resin oligomers with the templating component and the PAH to obtain a mixture; and casting and drying the mixture to obtain the precursor composition.

20. The method of claim 19, wherein synthesizing the phenolic resin oligomers comprises:

mixing and heating the phenolic compound and the cross-linkable aldehyde component in a sodium hydroxide solution;

neutralizing the solution with an acid solution; and evaporating water from the neutralized solution to obtain the phenolic resin oligomers.

* * * * *